Oct. 16, 1945.     G. B. BRUSTOLON     2,387,054
COMBINATION TWEEZERS AND MAGNIFYING DEVICE
Filed Nov. 3, 1943
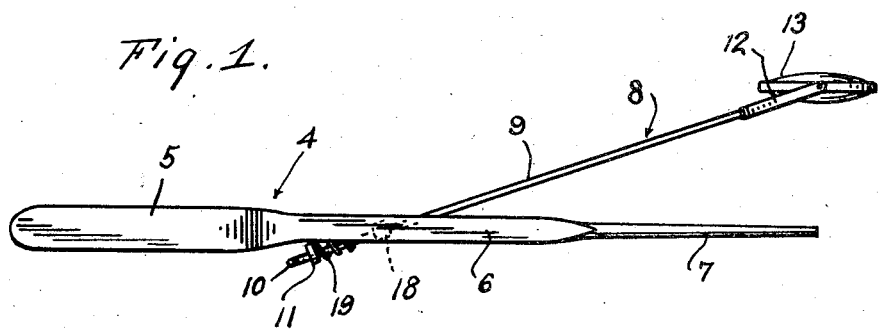
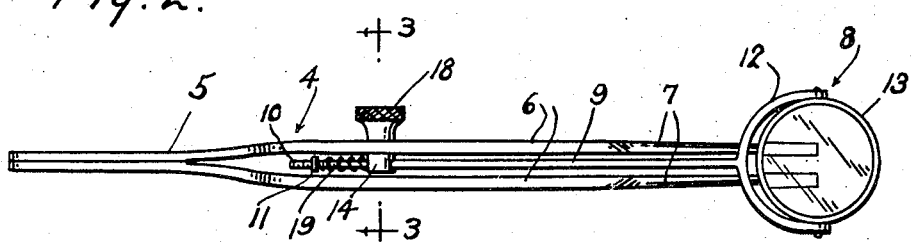
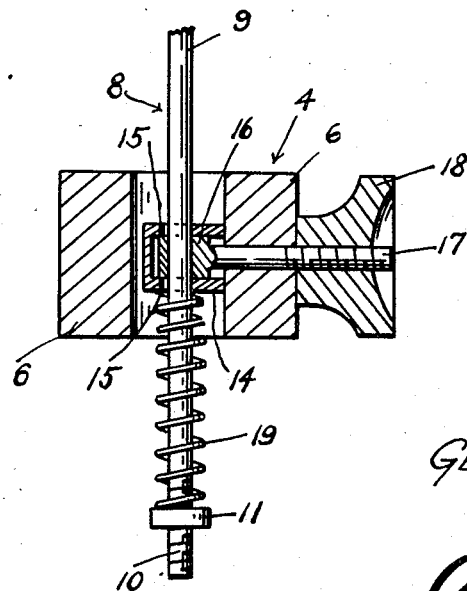
Inventor
GEORGE B. BRUSTOLON
By Clarence A. O'Brien
and Harvey B. Jacobson
Attorneys Patented Oct. 16, 1945

2,387,054

UNITED STATES PATENT OFFICE 2,387,054

COMBINATION TWEEZERS AND MAGNIFYING DEVICE

George B. Brustolon, Groton, Conn.

Application November 3, 1943, Serial No. 508,855

1 Claim. (Cl. 287—20.1)

The present invention relates to a two-way or combination instrument characterized, on the one hand, by a pair of tweezers; and on the other, by an associated magnifying glass and attaching and adjusting device therefor.

Needless to say, I am aware that the use of a magnifying glass in association with the probing ends of the tweezer limbs is not broadly new. It follows, therefore, that the principal novelty is in the construction of the parts or device carrying the magnifying glass and the ways and means of adjustably and separably adjoining it to one of the limbs of the tweezers.

In reducing my idea to practice, I have evolved and produced a novel combination implement or structure which can be used for a variety of purposes such as will readily suggest themselves to the mind of the user, the main purpose, of course, being to focus the magnifying lens or glass on the probing ends of the limbs so as to facilitate extracting splinters, dislodging blackheads and for many other uses which need not herein be explicitly alluded to.

More explicitly, novelty resides in the ways and means of joining and clamping the rod member of the magnifying device to one of the limbs of the tweezers.

A further feature has to do with the provision of a coiled spring and an adjusting nut for tensioning the spring, the spring surrounding said rod, bearing at one end against the nut and at its opposite end against the aforementioned assembling and adjusting device.

Other features and advantages will become more readily apparent from the following description and the accompanying illustrative drawing.

In the drawing, wherein like numerals are employed to designate like parts throughout the same:

Figure 1 is a side elevation of a pair of tweezers provided with magnifying device or instrument constructed in accordance with the principles of the present invention.

Figure 2 is a top plan view of the arrangement seen in Figure 1.

Figure 3 is an enlarged cross sectional view on the plane of the line 3—3 of Figure 2, looking in the direction of the arrows.

The tweezers are denoted by the numeral 4. This part of the structure is more or less conventional and includes a finger grip 5 and a pair of resilient parallel limbs or legs 6, the latter terminating in the customary probing terminals or points 7.

The magnifying device is separately denoted by the numeral 8. It comprises a rod or stem 9 screw-threaded at its inner end as at 10 to accommodate a nut 11. The opposite or outer end is provided with a yoke 12 in which the magnifying glass or lens 13 is swingably mounted in a conventional manner. In accordance with the invention the rod is swingably and slidably attached to one of the limbs 6. The device employed for accomplishing this comprises a cap-like member 14 which is in effect a socket. This is provided in opposite, that is, diametrically opposite walls with openings or apertures 15 larger than the diameter of the rod 9. Slidably mounted in the socket is an apertured block 16. The aperture in this instance, snugly receives the rod and the block slides in the socket through the instrumentality of the screw-threaded stem 17 passing through an opening in the adjacent limb. The screw-threaded end of the stem is provided with a binding or clamping nut 18. The rod 9 passes through the bore in the slide block 16 and through the apertures 15 in the cap 14. By loosening on the nut 18 the bore in the part 16 aligns with the apertures 15 to permit freedom of motion of the rod 9. That is to say, the rod can then be slid back and forth or rotated about the axis provided by the stem 17 turning in its bearing. By taking up on the nut the block 16 moves in a direction to bind the rod 9 against adjacent edges of the apertures 15 and consequently lock the rod 9 against both swinging and sliding movement.

The numeral 19 designates the cushioning spring which surrounds the rod, bearing at one end against the adjusting and tensioning nut 11 and at the opposite end against the cap 14.

In view of the fact that the rod is slidable longitudinally through the openings of the socket 14 and the head or block 16 and the stem 17 is rotatable in the opening of the leg 6 through which it passes, the rod 9 may be disposed diagonally, as shown in Figure 1, and pressure applied against the rear end of the rod to press the rod forwardly in opposition to action of the spring 19 to an adjusted position where it will be firmly held when the binding nut 18 is tightened. If the rod is thrust forwardly too far, it is merely necessary to ease pressure upon its rear end and the spring will shift the rod rearwardly. Therefore, the magnifying glass may be easily and quickly and very accurately adjusted.

As before indicated, the principal novelty is not in the broad combination so much as it is in the specific combination especially the arrangement of feature shown in Figure 3 characterized by parts 14, 16, 17 and 18. The spring and the adjusting means is of complemental importance.

It is thought that persons skilled in the art to which the invention relates will be able to obtain a clear understanding of the invention after considering the description in connection with the drawing. Therefore, a more lengthy description is regarded as unnecessary.

Minor changes in the shape, size and arrangement of details coming within the field of invention claimed may be resorted to in actual practice, if desired.

Having described the invention, what is claimed as new is:

In a device of the character described, a member formed with a transverse opening, a stem slidably and rotatably passing through said opening and having a threaded end portion projected from one side of said member and a head at its opposite end spaced from the member at the other side thereof from the protruding threaded end portion of the stem, said head being formed with an opening extending transversely of the stem, a socket member of greater depth than said head fitting about the head and having its inner end abutting the confronting side face of said member, said socket member having its walls formed with aligned openings for registering with the opening of the head, a rod passing through the openings of the head and the socket member and slidable through the openings, a spring about said rod having its inner end abutting the socket member, a tensioning nut for said spring threaded upon said rod and engaging the outer end of the spring, said spring yieldably resisting sliding of the rod through the socket member and the head in one direction, and a binding nut upon the threaded end portion of the stem for drawing the head into binding engagement with the rod holding the socket member firmly against the said member.

GEORGE B. BRUSTOLON.